United States Patent [19]

Gibson et al.

[11] 4,107,113

[45] Aug. 15, 1978

[54] AUTOXIDISABLE COMPOSITION

[75] Inventors: David Vincent Gibson, North Bayswater; Bruce Leary, Frankston, both of Australia

[73] Assignee: Dulux Australia Ltd., Melbourne, Australia

[21] Appl. No.: 683,243

[22] Filed: May 4, 1976

[30] Foreign Application Priority Data

May 15, 1975 [AU] Australia .............................. 1615/75

[51] Int. Cl.² .............................................. C08L 65/00
[52] U.S. Cl. ............................. 260/18 PF; 260/18 EP; 260/21; 260/22 EP
[58] Field of Search ............... 260/2.5 B, 2.5 D, 2.5 R, 260/22 B, 18 EP, 18 TN, 21, 849, 2 EC, 19 EP, 18 PF, 834, 22 EP; 427/386

[56] References Cited

U.S. PATENT DOCUMENTS

| 2,703,765 | 3/1955 | Osdal | 427/386 |
|---|---|---|---|
| 3,247,136 | 4/1966 | Wynstra et al. | 260/21 |
| 3,410,926 | 11/1968 | Hicks | 427/386 |

*Primary Examiner*—V. P. Hoke
*Attorney, Agent, or Firm*—Cushman, Darby & Cushman

[57] ABSTRACT

A convertible coating composition comprising a film-forming constituent which is a blend of (1) a low molecular weight mono or diepoxide, (b) a low molecular weight compound containing at least two reactive groups at least one of which is carboxyl and the other or others carboxyl or hydroxyl groups (c) a cross-linking agent and optionally (d) an autoxidisable fatty acid or alcohol. These coating compositions are low polluting as they may be applied by the use of only small amounts of solvents.

3 Claims, No Drawings

AUTOXIDISABLE COMPOSITION

This invention relates to convertible organic surface coatings and to a process of producing such coatings on a substrate.

We are concerned in this invention with organic materials which are applied in thin liquid films to substrates and then converted in situ to solid protective or decorative coatings thereon. The term "convertible" is used herein in its art-recognised sense of meaning that an irreversible chemical transformation is involved in the transition from a liquid to a solid film; a definition recognised in, for example, "Paint Technology Manuals Part Three — Convertible coatings," published by Chapman and Hall, London, 1972.

The basic requirement of any liquid organic suface coating is that it must comprise a so-called film-forming constituent, from which is derived the continuous, coherent, solid surface coating film. It is also known that if the solid film is to be useful as a protective or decorative coating, for example one with adequate mechanical strength or weathering resistance, it must be polymeric in nature and of relatively high molecular weight. The conversion from a liquid to a solid coating must also take place sufficiently rapidly to meet the requirements of contemporary coating application processes. Furthermore, suitably high molecular weight materials are not liquid at acceptable coatings application temperatures and hence if they are to be used as film-forming constituents of liquid organic surface coatings, they must be incorporated therein in the form of their solutions or dispersions in volatile liquids. This introduces another set of problems such as the economically and ecologically undesirable necessity to dispose of large quantities of volatile liquids during the conversion of liquid to solid coatings films.

In the case of autoxidisable convertible organic coatings, the accepted way of resolving these conflicting requirements has been to make use of a film-forming constituent which is itself at least partially polymeric and able to undergo a further chemical reaction to give the desired molecular weight during the conversion from a liquid to a solid coating film. The rate of conversion must, of course, be suitably rapid to match the required overall processing conditions. For example, while an autoxidisable triglyceride drying oil, which has a molecular weight of about 900, has the desirable characteristic of liquidity, there are many important potential applications where its rate of conversion to a hard material is too slow to be useful. An extensively adopted compromise has been to incorporate the important autoxidisable fatty acids chains of the oil into an oil-modified alkyd or epoxy ester resin, which will typically have a molecular weight in excess of 3000 and to accept the need to use those products in solution in a volatile organic liquid in exchange for much faster curing rates. Introduction of the alkyd structure, with the possibility of incorporating in it other chemically reactive groups, also admits of the use of reactions other than autoxidation to speed up the cure. A related approach, with similar advantages and drawbacks, is to replace the alkyd structure of the oil-modified alkyd with a vinyl or acrylic addition polymer, typically with a molecular weight of 10,000 or more, to which autoxidisable fatty acids chains are covalently bonded.

Contrary to these established practices, we have now made the surprising discovery that useful autoxidisable organic surface coatings which convert to hard films under the mild curing conditions used in the coatings industry, can be prepared from a mixture of film-forming constituents which are much lower in molecular weight than conventional autoxidisable film-forming polymers, provided they are selected in the manner which we now disclose. As a consequence, the mixture is either a free-flowing liquid at coatings application temperatures or is readily reducible to that consistency by adding to it a few percent of a volatile solvent for the mixture.

According to the present invention we now provide a liquid convertible coating composition the film-forming constituent of which is a mixture of the following components;

(a) a component which comprises on average 1–2 epoxide groups per molecule and which has a maximum average molecular weight of 1200, (b) a component which has a maximum average molecular weight of 1000 and which comprises on average at least one carboxyl group and at least one other group per molecule, the other group or groups being chosen from carboxyl and hydroxyl groups, (c) a cross-linking agent which comprises at least two chemical groups per molecule which will react with hydroxyl groups, and (d) from 0–50% by weight of the mixture of an autoxidisable component selected from an autoxidisable monocarboxylic fatty acid and an autoxidisable fatty monohydric alcohol, the said components being present in the mixture in such proportions that (1) the ratio of the total number of epoxide groups in component (a) to the total number of carboxyl groups in the mixture is from 1 : 0.5 to 1 : 3.0, (2) the total weight of components (a) plus (b) plus (d) is 50–96% by weight of the mixture, and (3) the mixture comprises 10–70% by weight of autoxidisable fatty residues, and further characterised in that the said components are selected from materials which do not boil or decompose below 180° C.

We further provide a process of coating a substrate which comprises applying to the substrate by any suitable means a film of a liquid convertible coating composition as hereinabove defined and the film under such conversion conditions that epoxide groups will react with carboxyl groups and the cross-linking agent will react with hydroxyl groups.

Component (a) may be a single material or a mixture of materials provided that the parameters given above are adhered to. It is thus possible to have one or more materials whose individual molecular weights exceed 1,200, provided that the maximum average molecular weight does not exceed 1,200. It would be possible, for example, to have a component (a) which comprised 20% by weight of a material of molecular weight 1,500 and 80% by weight of a material or molecular weight 1,000 as the overall average molecular weight would be 1,100 which is within our limits.

Typical examples of suitable components (a) are to be found in the ranges of commercially-available diepoxides, for example, the di-glycidyl ester of hexa-hydro phthalic anhydride and the reaction products of 2,2-bis (p-hydroxyphenyl)propane (also known as bis phenol A) with epichlorhydrin available commercially under the trade name "Epikote" (trade mark). Component (a) may also be chosen from the class of mono-epoxides such as the mono-ester formed by the reaction of a diepoxide of the above-mentioned type with a monocarboxylic acid; examples of acids which may be used are acetic, propionic and decanoic acids, autoxidisable fatty acids such as, for example, tall oil fatty acids and monocarboxylic acids derived from naturally occurring vegetable oils such as castor, dehydrated castor, safflower, linseed and tung oils. A preferred compound of this type is a mono-ester of an autoxidisable monocarboxylic fatty acid and the diglycidyl ether of bisphenol A. The mono-ester may also be the glycidyl ester of a monocarboxylic acid, typical examples of which are available commercially under the name "Cardura" (trade mark). Other materials which may be used are epoxidised oils, that is, naturally-occurring triglyceride oils some of whose double bonds have been converted to epoxide groups by reaction with peroxides.

Component (b) has a maximum average molecular weight of 1,000 and comprises on average at least one carboxyl group and at least one other group per molecule, the other group or groups being chosen from carboxyl groups and hydroxyl groups. Component (b) may be a single material or a mixture of materials as is the case with component (a)

Examples of suitable materials include, for example;

dicarboxylic acids, e.g. dimer fatty acids such as "Emery" 3393D (trade mark), and the reaction product of equimolar proportions of a maleinised autoxidisable monocarboxylic acid and neopentyl glycol;
hydroxy acids, e.g., ricinoleic and salicyclic acids;
tricarboxylic acids, e.g. the reaction product of equimolar proportions of a maleinised autoxidisable monocarboxylic acid and ricinoleic acid;
maleinised autoxidisable compounds, e.g. maleinised linseed oil fatty acid; and maleinised 1,4-cis-polybutadiene; and acid anhydrides, e.g. dodecenyl succinic anhydride and hexahydrophthalic anhydride.

For the purposes of this invention, an acid anhydride ring is considered to be equivalent to two carboxyl groups.

The above examples are purely for illustration of the nature of the invention and are not to be construed as limiting its scope in any way.

It will readily be seen by persons skilled in the art that certain components (a) will be slower to react with some permitted components (b) than with others. For example, a component (b) whose reactive groups consist solely of an acid anhydride ring will not react readily with certain diepoxides in the absence of an active hydrogen; thus, reaction of such components (b) with those diepoxides will be very slow. Such slow-reacting combinations are well understood and can be avoided altogether or triggered by the use of a suitable catalyst.

Component (c) is a cross-linking agent comprising at least two chemical groups per molecule reactable with hydroxyl groups. This component may be chosen from the class of materials which are known to act as cross-linking materials for hydroxyl group-bearing materials Typical examples of components (c) which will react with hydroxyl groups at baking temperatures of, for example, 170° C, are urea- and melamine- formaldehyde resins. An especially useful and preferred material of this type is a methylol melamine containing 4–6 methylol groups per molecule which groups are substantially fully etherified with methanol or ethanol. Typical commercial examples of this general type of cross-linking agent are the materials known as "Cymel" 300 and 301 (trade mark). Alternatively, it may be desirable to react component (c) at temperatures below baking temperatures commonly used in the art. For this purpose, materials such as polyfunctional isocyanates may be used. One such series of materials is available commercially under the name "Desmodur" (trade mark). Materials of this type which co-react readily at ambient temperature are useful as "multipack systems" that is systems where the individual components are kept separate and are mixed immediately prior to application to a substrate.

Component (d) is selected from autoxidisable monocarboxylic fatty acids and autoxidisable fatty monohydric alcohols. The autoxidisable monocarboxylic fatty acid may be a segregated autoxidisable fatty acid such as, for example, ricinoleic, linolenic, linoleic and oleic fatty acid or an ester of such a fatty acid with a hydroxy acid, for example 12-hydroxy stearic acid. Alternatively mixtures of fatty acids, for example the mixed fa;tty acids derived from naturally-occurring triglyceride oils such as dehydrated castor, safflower, soya, linseed, tung and tall oils may also be used. The autoxidisable fatty alcohols which may be used as component (d) are the theoretical reduction products of the autoxidisable fatty acids hereinabove described, a typical example being "Ocenol," a commercial fatty alcohol which comprises an autoxidisable chain with 18 carbon atoms. It is permissible to blend monohydric alcohols and monocarboxylic acids to give a component (d).

The individual components of the liquid convertible coating composition must be blended together in the proportions defined hereinabove, if satisfactory coating films are to be produced. For example, if the ratio of the total number of epoxide groups in component (a) to the total number of carboxyl groups in the mixture lies outside of the limits of 1 : 0.5 to 1 : 3.0, in our judgment the resulting coating films are too soft and lacking in mechanical integrity to be of practical value. We have also observed certain trends in properties within these overall limits. In particular, although coatings which are quite useful for many applications can be prepared at ratios greater than 1: 1.5, there appears to be a progressive decrease in film hardness as the limit of 1 : 3.0 is approached. For the best results, therefore, we prefer that the ratio of the total number of epoxide groups in component (a) to the total number of carboxyl groups in the mixture shall be from 1 : 0.5 to 1 : 1.5.

The 10–70% of autoxidisable residues may be wholly derived from the autoxidisable monocarboxylic fatty acids and alcohols of component (d). For the purposes of this invention, "autoxidisable residues" means autoxidisable unsaturated hydrocarbon chains, excluding any functional group attached to the end of the chain, or any remnant of such a group following its reaction with another group. Thus, in the case of an autoxidisable fatty acid or alcohol, the carboxyl or hydroxyl groups respectively are excluded from consideration. In the case of a maleinised autoxidisable chain, we treat such a chain as if it were not maleinised. Alternatively, the other three components may comprise sufficient autoxidisable residues and component (d) may not be necessary. It is permissible to derive the autoxidisable residue content of the film-forming constituent from a combination of these two sources.

Additionally, we have found that for satisfactory working of our invention, none of the constituent materials of the components should boil or decompose below 180° C. We have found that cured films of coating compositions comprising a component which does not comply with this condition are unacceptably soft.

The film-forming constituent is prepared by blending together the selected constituents in a conventional manner. This will normally be a simple mixing process, if the constituents are completely mutually compatible. Should some incompatibility be observed, however, it may be necessary to resort to the known technique of incorporating a proportion of a co-solvent for the constituents into the composition to gain the desired stability. Since this will usually have the effect of reducing the total non-volatile content (total solids) of the composition, when very high solids coating compositions are desired it is then preferable to limit the selection of constituents to those materials which are mutually compatible per se. It is a special feature of our invention that because of the manner in which our constituents are selected, especially with regard to the upper limit of molecular weight, many of our compositions are inherently of such low viscosity that they have acceptable application viscosities at weight solids contents in excess of 80%. This property represents a considerable advantage when viewed in the light of current attitudes to raw materials conservation and atmospheric pollution.

The film-forming constituents can be readily processed into a coating composition in known manner. For example, if the coating is to be a clear varnish, the film-forming constituent itself, optionally catalysed, may itself provide a suitable material. On the other hand, conventional constituents, for example pigments, driers, preservatives and other auxiliary materials may be dispersed or dissolved therein to produce opaque and/or colored coating compositions.

The convertible coating compositions of our invention may be applied to substrates by, for example, brushing, rolling, dipping or spraying. Curing of the coating to a hard film may be carried out by, for example, allowing it to dry in air at ambient temperature, preferably accelerating the cure by heating and/or catalysing the mixture.

The invention is further illustrated by the following examples in which all parts are expressed by weight.

EXAMPLE 1

Preparation of a coating composition according to the invention. The film-forming constituent comprises a mixture of a mono-epoxide of molecular weight 680 (component (a)), two hydroxy acids of average molecular weight 290 (component (b)) and hexamethoxy methyl melamine (component (c)). There is no component (d).

The ratio of the total number of epoxide groups to carboxyl groups in the film-forming mixture is 1 : 1.2, the total weights of components (a) plus (b) is 91% of the weight of the mixture and the mixture comprises 41% by weight of autoxidisable residues.

The following components were ground to a dispersion of 10-15 micron (as measured on a Hegmann gauge):

| | |
|---|---|
| rutile titanium dioxide | 729 parts |
| barytes | 2344 parts |
| silica | 26 parts |
| anti-skinning agent* | 20 parts |
| montmorillionite - based anti-settling agent | 15 parts |
| mono-epoxide (the reaction product of the equimolar proportions of "Epikote" 828 (trade mark) and linseed oil fatty acid) | 190 parts |
| n-Butyl acetate | 500 parts |

*A commercial grade of 2,6 di-tertiary butyl 4-methyl phenol was used.

The following were then mixed until homogeneous:

| | |
|---|---|
| dispersion (as prepared above) | 3824 parts |
| mono-epoxide (as described above) | 838 parts |
| ricinoleic acid | 370 parts |
| citric acid | 37 parts |
| "Cymel" 301* | 142 parts |
| methyl ethyl ketone | 444 parts |

*hexamethoxy methyl melamine ("Cymel" is a trade mark)

The film forming constituent thus comprised

| | |
|---|---|
| monoepoxide | 1028 parts |
| ricinoleic acid | 370 parts |
| citric acid | 37 parts |
| "Cymel" 301 | 142 parts |

The above coating composition had a non-volatile content of about 83% by weight when thinned to a viscosity suitable for spray application.

EXAMPLE 2

Preparation of a coating composition according to the invention in which the film-forming constituent comprises a mixture of a mono-epoxide of molecular weight 680 (component (a)), a tricarboxylic acid of average molecular weight 680 (component (b)) and hexamethoxy methyl melamine (component (c)). There is no component (d). The ratio of the total number of epoxide groups in component (a) to the total number of carboxyl groups in the mixture is 1 : 1.5, the total weights of components (a) plus (b) is 90% of the weight of the mixture and the mixture comprises 41% by weight of autoxidisable residues.

The preparation was similar to that described in Example 1 except for the replacement of the materials of the film-forming constituent of that example by the following materials;

| | |
|---|---|
| mono-epoxide (from example 1) | 1028 parts |
| tricarboxylic acid (reaction product of equimolar proportions of ricinoleic acid and maleinised tall oil fatty acid) | 514 parts |
| "Cymel" 301 | 180 parts |

The resulting coating composition had a non-volatile content of about 83% by weight when thinned to a viscosity suitable for spray application.

EXAMPLE 3

This is a comparative example illustrating the performance of coatings according to the invention with respect to conventional coatings. Use of the coating compositions of Examples 1-2 as undercoats for a thermosetting acrylic enamel and comparative testing with a commercially available automotive epoxy ester primer.

The coating compositions of Examples 1-2 and the epoxy ester primer were sprayed on to zinc phosphated steel panels to give a dry film build of 25-30 micron and baked in a 177° C hot air oven for 25 minutes. The panels were then coated with a 40 micron (dry film build) layer of a commercial acrylic enamel and baked for 30 minutes in a 130° C oven.

The panels were subjected to the following tests:

(a) Test to Determine Adhesion of Undercoat to Metal

This was carried out in accordance with Test Method BI 6-1, Part A of the Ford Motor Company, one of a series of test methods well known to the art. It involves cross scribing a coated panel, applying a strip of adhesive tape over the cross scribes, pulling the strip away and estimating the adhesion from the amount of paint remaining at the cross scribes.

(b) Test to Determine Adhesion of Top Coat to Undercoat

This was carried out along the lines of Ford Test Method BI 6-1, Part B, except that the scribes do not go through to the metal but only to the undercoat.

(c) Gravellometer Test

In this test a panel is hung vertically in a gravellometer and then bombarded with 400 g of fresh gravel blown at the panel by an air blast. The air blast has a pressure of 90 p.s.i. and the bombardment takes places over a period of 10 seconds. The paint film on the panel is assessed on a scale of from 1 to 10 where 10 represents no damage and 1 complete removal of the paint film.

(d) Impact Test

This test was carried out in the manner prescribed by Specification 20/38, part 4 (a) of Chrysler Australia Ltd. The panel is subjected to an impact force of 80 in lb and examined for cracking.

(e) Flexibility Test

This test is identical to that of Ford Test Method BI 5-1. The panel is bent through 180° on a conical mandrel and checked for damage to the film, the film being rated on a flexibility scale of from 1 to 5 with 5 best and 1 worst.

(f) Salt Spray Test

This test was carried out in the manner prescribed by Ford Test Method BI 3-1 except that the panels were exposed for 350 hours. A line is scribed through the paint film to the metal along the longtitudinal axis of the panel before testing and at the end of the test, the extent of corrosion is measured from the scribe line in millimeters.

(g) Humidity Test

This test was carried out in the manner prescribed by Ford Test Method BI 4-2 except that the temperature of the test was raised from 43° to 60° C, thus making the test more severe. The panels were exposed to a high humidity atmosphere in a Cleveland humidity cabinet for 240 hours and the degree of blistering measured by reference to the "Exposure Standards Manual" of the Federation of Societies for Paint Technology. In this Manual, blisters are rated for size by an arbitrary numerical scale from 10 to 0 (10 represents no blistering) and for frequency by a series of ratings which are as follows: D (dense), MD (medium dense), M (medium) and F (few).

The results are as follows:

|  | Commercial Epoxy ester primer | Example 1 | Example 2 |
|---|---|---|---|
| (a) Adhesion to metal | Excellent | Excellent | Excellent |
| (b) Intercoat adhesion | Good | Good | Good |
| (c) Gravellometer | 9 | 9 | 9½ |
| (d) Impact | Moderate cracking | Slight cracking | Moderate cracking |
| (e) Flexibility | 3 | 5 | 4 |
| (f) Salt spray (mm) | 1 | 1-2 | 1 |
| (g) Humidity | 8M | 8M-8D | 8F |

It can be seen from the results that overall the properties of the commercial epoxy ester primer and those of the compositions of the two Examples are similar. However, the compositions of the Examples have the advantage that they can be applied at about 83% solids by weight in contrast with the epoxy ester primer which can be applied at only about 45% solids by weight.

EXAMPLE 4

This example illustrates coating compositions according to the invention prepared using a range of constituents as component (a).

Example 2 was repeated except that the 1028 parts of the monoepoxide in the film forming constituent used therein were replaced in turn with:

(i) 1028 parts of a monoepoxide prepared by esterification of equimolar proportions of 'Epikote' 828 (trade mark) and dehydrated castor oil fatty acid.
(ii) 1028 parts of a monoepoxide prepared by esterification of equimolar proportions of Epikote 828 and soya bean oil fatty acid.
(iii) 1055 parts of a monoepoxide prepared by esterification of equimolar proportions of Epikote 828 and ricinoleic acid.
(iv) 302 parts of a diepoxide, 'Epikote' 828 (trade mark).

In each case the pigments were ball milled in the presence of an appropriate part of the film forming composition. Liquid coatings were then prepared as in Example 2, applied to a steel substrate and tested as in Example 3. In each case, properties similar to those obtained from the coating based on the composition of Example 2 were obtained.

EXAMPLE 5

This example illustrates coating compositions according to the invention prepared using a range of materials as component (b). Example 2 was repeated except that component (b) of the film forming constituent, the tricarboxylic acid (514 parts) was replaced in turn with:

(i) 514 parts of a tricarboxylic acid prepared as the monoesterification reaction product of equimolar proportions of ricinoleic acid and maleinised linseed oil fatty acid.
(ii) 287 parts of maleinised linseed oil fatty acid prepared by reaction of equimolar proportions of linseed oil fatty acid and maleic anhydride.

(iii) 435 parts of a dicarboxylic acid prepared as the monoesterification reaction product of equimolar proportions of neopentyl glycol and maleinised linseed oil fatty acid.

(iv) 493 parts of a dicarboxylic acid prepared as the monoesterification reaction product of equimolar proportions of citric acid and a glycidyl ester of an aliphatic branched chain, the glycidyl ester having a molecular weight of 245. A commercial material known as Cardura E supplied; by Shell Chemical Co. was used.

(v) 635 parts of a dimer fatty acid.

A commercial material 'Empol' 1022 (trade mark) was used.

Liquid coating compositions were then prepared as in Example 2 and, after stoving and evaluating as in Example 3, results were similar to those obtained from the composition of Example 2.

EXAMPLE 6

This example illustrates coating compositions according to the invention prepared using a range of constituents as component (c).

Example 2 was repeated except that the 180 parts of "Cymel" 301 (trade mark) were replaced in turn by:

(i) 300 parts of a 60% by weight non-voltile content butylated urea formaldehyde resin.
(ii) 300 parts of a 60% by weight non volatile content butylated melamine formaldehyde resin.
(iii) 225 parts of an 80% by weight non-volatile content methylated melamine formaldehyde resin. (A material, designated UFORMITE MM-83 (trade mark) supplied by Rohm & Haas was used.

These coatings were evaluated by the general method of Example 3 and were found to have similar properties to coatings based on the composition of Example 2. However, the solids at spray application were noted as being approximately 8% lower for (i) and (ii) and 5% lower for (iii) than for the Example 2 composition.

EXAMPLE 7

This is a comparative example which illustrates coating compositions wherein the ratio of the total number of epoxide groups in component (a) to the total number of carboxyl groups in the mixture is varied. Example 2 was repeated except that the 514 parts of the tricarboxylic acid were replaced in turn by 137, 274, 600, 767, 933 and 1066 parts of the same tricarboxylic acid. These correspond to an epoxide to carboxyl ratio of 1 : 0.4, 1 : 0.8, 1 : 1.8, 1 : 2.3, 1 : 2.8 and 1 : 3.2 respectively. In addition the 180 parts of CYMEL 301 were replaced by 200 parts of UFORMITE MM-83.

Coating compositions were prepared by the method of Example 2 then stoved and tested by the general method of Example 3. The test results showed that the coatings wherein the ratios were 1 : 0.4 and 1 : 3.2 which are both outside the scope of the invention, were unsatisfactory as the films were unacceptably soft and did not warrant further testing. The other compositions, all within the scope of the invention, performed adequately, although their test results were slightly inferior to those obtained from the coating based on the compositions of Examples 1 and 2. At ratios above 1 : 1.5 progressively softer films were observed.

EXAMPLE 8

This example illustrates compositions according to the invention wherein component (d) is a linseed oil fatty acid. Example 2 was repeated except that the quantity of tricarboxylic acid was reduced to 308 parts and linseed oil fatty acid (254 parts) were added. Component (d) thus provides 14.4% by weight of the film-forming constituents.

These film-forming constituents were compounded into a coating composition by the general method of Example 2 and tested according to Example 3. The coating performed similarly to that derived from the product of Example 1.

EXAMPLE 9

This example illustrates the preparation and test results of a general industrial spray enamel the composition of which is according to the invention.

A coating composition was prepared by grinding to a dispersion of less than 5 micron (as measured on a Hegman gauge)

| | |
|---|---|
| mono-epoxide (the reaction product of equimolar proportions of 'Epikote' 828 (trade mark) and ricinoleic acid) | 36.05 parts |
| rutile titanium dioxide | 10.81 parts |
| n-butyl acetate | 4.51 parts |
| toluene | 4.51 parts |

The dispersion was then mixed until homogeneous with a dicarboxylic acid, prepared as a 77.4% non-volatile solution in n-butyl acetate by the reaction of equimolar proportions of citric acid and "Cardura" E (trade mark) (8.86 parts), a monoepoxide as prepared above (11.25 parts), 'Cymel' 301 (trade mark) (7.34 parts), xylene (12.50 parts) and n-butyl acetate (4.17 parts)

The film forming constituent thus comprised

| | |
|---|---|
| Monoepoxide (as described above) | 47.30 parts |
| "Cardura" E citrate | 6.86 parts |
| "Cymel" 301 | 7.34 parts |

The ratio of the total number of epoxide groups to carboxyl groups in this mixture is 1 : 0.68, the total weights of components (a) plus (b) is 88% of the weight of the mixture and the mixture comprises 26.6% by weight of autoxidisable residues. The resulting coating composition had a non-volatile content of about 72% and a viscosity of 35 secs (as measured by a Ford 4 cup at 25° C). The electrical resistivity of the composition was 2 megohms. The above coating composition was tested as follows:

The coating composition was sprayed onto a zinc phosphate treated steel panel to obtain a dry film build of 30-35 microns and baked at 150° 15 mins. After cooling, the panel was subjected to the following tests:

| | Results |
|---|---|
| Pencil Hardness | 3-4 H |
| Knoop Hardness | 8-10 ("Tukon" Hardness tester) |
| Gloss, 60° Meter | 60% |
| Conical Mandrel | 100% Pass |

The test results indicate that this composition is a satisfactory industrial enamel which may be applied at considerably higher non-Volatile contents than conventional enamels, which typically have a non-volatile content of the order of 45% by wt.

We claim:

1. A liquid convertible coating composition capable of forming a solid film on a substrate, the film-forming constituent of which is a mixture consisting essentially of the following components;
   (a) a component wich comprises epoxide groups and which has a maximum average molecular weight of 1200;
   (b) a component which has a maximum average molecular weight of 1000 and which comprises on average at least two carboxyl groups; and
   (c) a cross-linking agent which comprises at least two chemical groups per molecule which will react with hydroxyl groups, the said components being present in the mixture in such proportions that
   (1) the ratio of the total number of epoxide groups in component (a) to the total number of carboxyl groups in the mixture is from 1 : 05 to 1 : 3.0 and
   (2) the total weight of components (a) plus (b) is 50–96% by weight of the mixture, characterised in that
   (i) component (a) is a compound which comprises on average one epoxide group and one autoxidisable fatty acid residue per molecule;
   (ii) component (a) comprises at least one autoxidisable fatty acid residue per molecule; and
   (iii) the mixture comprises from 10–70% by weight of autoxidisable fatty acid residue, and further characterised in that the said components are selected from materials which do not boil or thermally decompose below 180° C.

2. A liquid convertible coating composition according to claim 1 in which the component (a) is a monoester of an autoxidisable monocarbocylic fatty acid and the diglycidyl ether of bisphenol A.

3. A liquid convertible coating composition according to claim 1 in which the component (c) is a methylol melamine containing 4–6 methylol groups per molecule which groups are substantially fully etherified with methanol or ethanol.

* * * * *